US007127574B2

(12) United States Patent
Rotithor et al.

(10) Patent No.: US 7,127,574 B2
(45) Date of Patent: Oct. 24, 2006

(54) METHOD AND APPARATUS FOR OUT OF ORDER MEMORY SCHEDULING

(75) Inventors: Hemant G. Rotithor, Hillsboro, OR (US); Randy B. Osborne, Beaverton, OR (US); Nagi Aboulenein, Portland, OR (US)

(73) Assignee: Intel Corporatioon, Santa Clara, CA (US)

( * ) Notice: Subject to any disclaimer, the term of this patent is extended or adjusted under 35 U.S.C. 154(b) by 236 days.

(21) Appl. No.: 10/692,245

(22) Filed: Oct. 22, 2003

(65) Prior Publication Data

US 2005/0091460 A1 Apr. 28, 2005

(51) Int. Cl.
*G06F 12/02* (2006.01)

(52) U.S. Cl. ....................................... 711/158; 711/167

(58) Field of Classification Search .................... 711/5, 711/105, 111, 147, 158, 168, 217, 167; 710/40, 710/52

See application file for complete search history.

(56) References Cited

U.S. PATENT DOCUMENTS 5,301,278 A * 4/1994 Bowater et al. ............... 711/5
5,948,081 A * 9/1999 Foster ......................... 710/40
6,145,065 A * 11/2000 Takahashi et al. .......... 711/158
6,154,826 A * 11/2000 Wulf et al. ................ 711/217
6,182,192 B1 * 1/2001 Rovati ........................ 711/111
6,378,049 B1 * 4/2002 Stracovsky et al. ......... 711/147
6,381,672 B1 * 4/2002 Strongin et al. ............ 711/105
6,470,433 B1 * 10/2002 Prouty et al. .............. 711/168
6,510,497 B1 * 1/2003 Strongin et al. ............ 711/151
6,526,484 B1 * 2/2003 Stacovsky et al. .......... 711/158
6,546,439 B1 * 4/2003 Strongin et al. .............. 710/52
6,725,347 B1 * 4/2004 Yang et al. ................. 711/167
2002/0065981 A1 * 5/2002 Jenne et al. ................ 711/105
2004/0128428 A1 * 7/2004 Christenson ................... 711/5

* cited by examiner

*Primary Examiner*—Pierre Bataille
*Assistant Examiner*—Paul Schlie
(74) *Attorney, Agent, or Firm*—Sharon Wong

(57) ABSTRACT

Embodiments of the present invention provide an algorithm for scheduling read and write transactions to memory out of order to improve command and data bus utilization and gain performance over a range of workloads. In particular, memory transactions are sorted into queues so that they do not have page conflict with each other and are scheduled from these queues out of order in accordance with read and write scheduling algorithms to optimize latency.

42 Claims, 10 Drawing Sheets

100
Processor
102
Memory Controller
106
Main Memory
104

200

METHOD AND APPARATUS FOR OUT OF ORDER MEMORY SCHEDULING

BACKGROUND

Modern memory, such as dynamic random access memory (DRAM), is used throughout the computer industry. Memory is organized into pages. Each page of memory contains data for a number of contiguous memory locations. Memory devices, such as DRAM, are further organized into a small number of banks per DRAM device (e.g., four banks). Each of these devices has many pages per bank. Only a single page can be accessed from a bank at a time.

Before a particular page within a bank can be accessed, that page must be opened using an "activate" command. This activate command is also known as a row command. A memory request requiring a page to be opened is called a "page empty" access request. A memory request to a page that has already been opened is known as a "page hit" access request. A page may be closed using a "pre-charge" command. If page P0 is open when a request is received to access a location in page P1 that happens to be located in the same memory bank as P0, page P0 must first be closed before page P1 can be opened. A page conflict, such as this, occurs when one page must be closed before a desired page can be opened. This situation is known as a "page miss" access. Page miss has a larger access latency than a page empty and a page empty has a larger access latency than a page hit.

Page hit and page empty accesses to different memory banks may be interleaved such that available data bandwidth may be maintained. Page miss accesses, however, typically result in a reduction of available data bandwidth. Therefore, page misses are particularly detrimental for DRAM performance.

Memory performance is partly limited by poor command and data bus bandwidth utilization that occurs with DRAM page misses when requests are sequentially scheduled. Conventional overlapped scheduling techniques attempt to overlap the pre-charge/activate phases of adjacent commands to reduce the page miss/empty penalty while maintaining the order in which the CAS for these adjacent commands are issued to be the same as in order execution.

DETAILED DESCRIPTION

Figure 1:
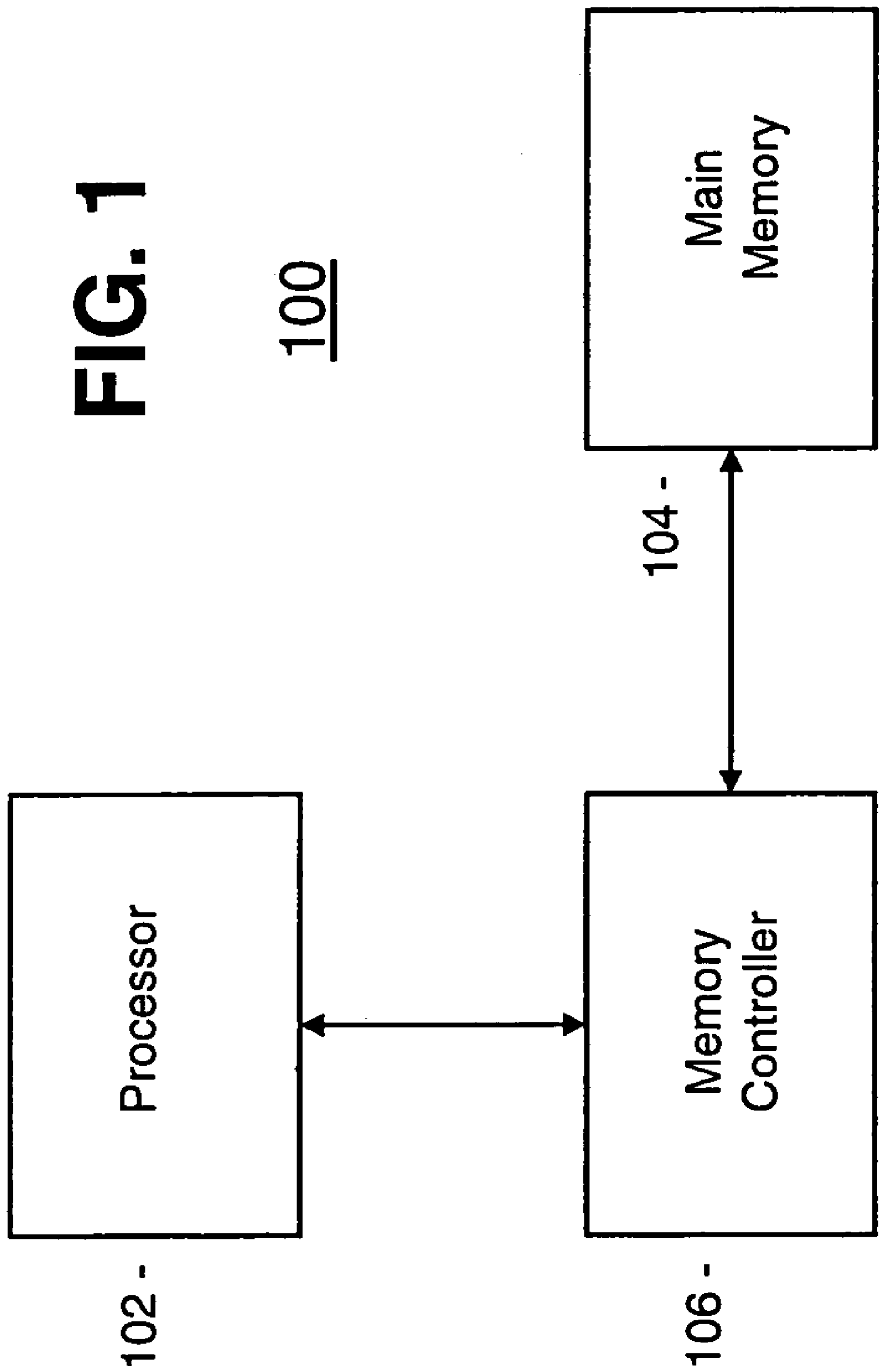
FIG. 1 illustrates a functional block diagram of an embodiment of an exemplary computer system embodying the present invention.

Embodiments of the present invention provide algorithms for scheduling read and write transactions to memory out of order to improve command and data bus utilization and gain performance over a range of workloads. In particular, memory transactions are sorted into queues and within each queue, memory transactions are sorted by arrival time. Memory transactions are scheduled out of order in accordance with read and write scheduling algorithms to optimize latency. Out of order selection is done at the time of launching a dram command (just in time scheduling). By making out of order selection at the time of dram command launch and not earlier, read and write queues are allowed to fill up without delaying the dram command. Filled queues result in more entries to choose from for an out of order scheduling decision, and thus better scheduling decisions can be made. Moreover, the entire queue is considered while making scheduling decisions. Many variations of the policy can provide comparable performance that may simplify the read and write queue structures and out of order selection. Embodiments of the out of order scheduling policy are flexible enough to accommodate any page closing policy with no assumption being made about pages being in a particular "page miss/page empty/page hit" state. A server out of order policy may assume pages mostly in a page empty state and design a policy tailored to those workloads. The proposed out of order algorithm does not require the read data to be returned out of order on the interconnect to the processor. The algorithm will work well with either an in order or an out of order interconnect to the processor.

In the detailed description, numerous specific details are set forth in order to provide a thorough understanding of the present invention. However, it will be understood by those skilled in the art that the present invention may be practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software (microcode), or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

FIG. 1 illustrates a functional block diagram of an embodiment 100 of an exemplary computer system embodying the present invention. Computer system includes processor 102, main memory 104 and memory controller 106. Main memory 104 may be large capacity random access memory in which application programs are stored and from which processor 102 primarily executes. One skilled in the art will recognize that memory can be comprised of various types of memory and reference to DDR (Double Data Rate synchronous DRAM) memory is for illustrative purposes only. For example, memory 104 can include, but is not limited to memory types such as SDRAM (Synchronous DRAM), RDRAM (RAMBUS DRAM), DRAM, and so forth.

As used herein, a "page" refers to a block of data stored within a same row of DRAMs that comprise memory 104. The row is accessed via a row address provided by memory controller 106, and then the column address of the particular datum being addressed is provided (typically using the same address lines used to provide the row address). Another column address can be used to access additional data within the row without providing the row address again (referred to as a "page hit"). Reading or writing additional data from the same row in this manner (referred to as "page mode") may allow for lower latency access to the data, since the row address need not be provided in between each column access. This also results in better utilization (and thus available bandwidth) of memory.

As used herein, a "memory request" is a transfer of command and address between an initiator and memory 104. A "read memory request" is a transfer of data from memory 104 to the initiator. For example, processor 102 may initiate a read memory request to transfer data from memory 104 to processor 102. A "write memory request" is a transfer of data from the initiator to memory 104. For example, processor 102 may initiate a write memory request to transfer data from processor 102 to memory 104. Control information (including, e.g. the priority level and the read/write nature of the memory request) may be conveyed concurrent with the memory request or using a predefined protocol with respect to conveyance of the address.

Figure 2:
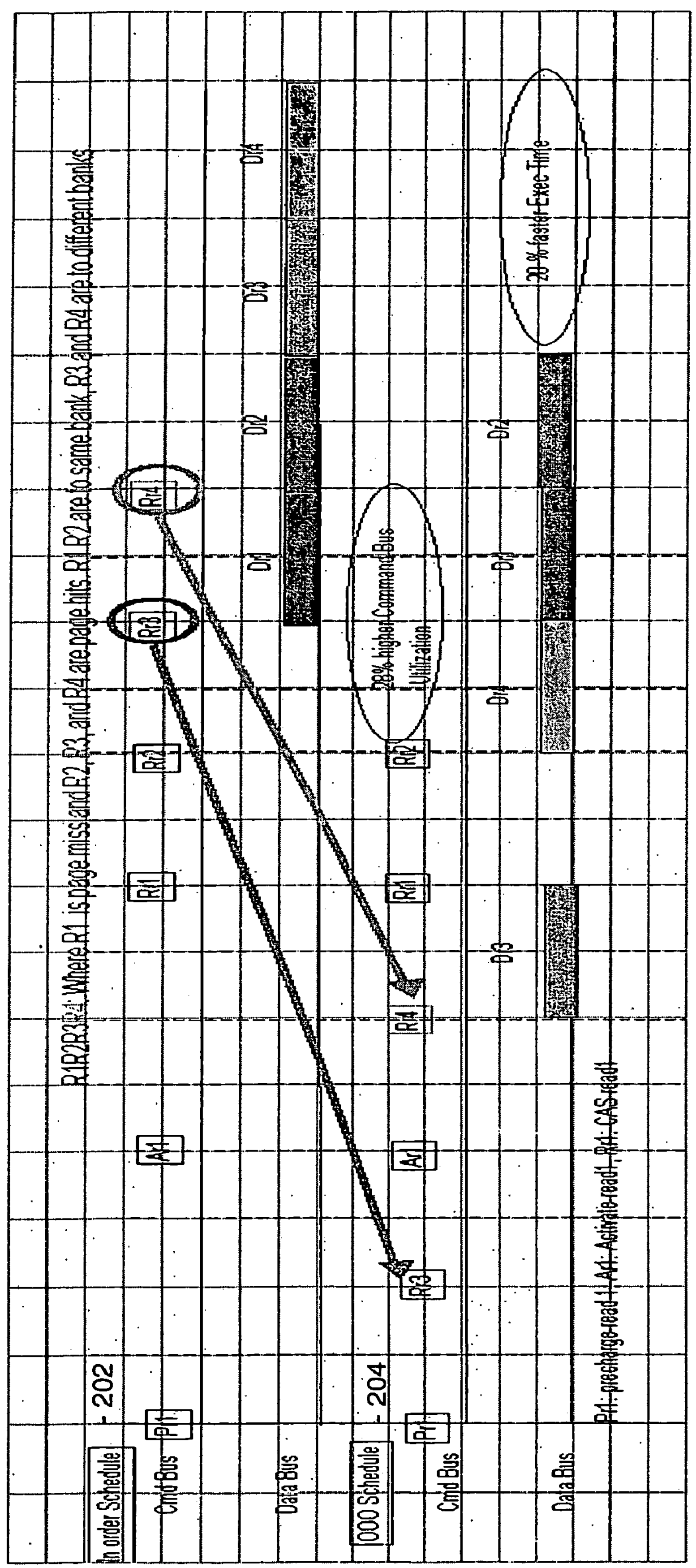
FIG. 2 illustrates a timing diagram of an embodiment of a command bus issuing read commands using "in order" and "out of order" scheduling.

FIG. 2 illustrates a timing diagram of an embodiment 200 of a command bus (CmdBus) issuing read commands using "in order" 202 and "out of order" 204 scheduling. The data bus line (DataBus) illustrates when the read data is read from the memory device and output onto the main bus. The example shown is for DDR memory system with 4/4/4 (tCL/tRCD/tRP) core timing, 2n (i.e. 2 clock cycles) command timing and burst length 4. Here, tCL is the CAS latency, tRCD is the activate to CAS delay, tRP is the precharge time, and 2n command timing implies that the minimum interval between 2 successive DRAM commands being issued is 2 DRAM clocks. R1 represents a page miss, R2, R3, and R4 represent a page hit. R1 and R2 are reads to the same bank and R3 and R4 are reads to other banks than that of R1. When a page miss occurs, for example R1, a pre-charge read (Pr1), activate read (Ar1) and CAS read (Rr1) commands are scheduled. One skilled in the art will recognize the implementation shown is for illustrative purposes. Embodiments of the present invention can be applied to various implementations.

For "in order" scheduling 202, read commands are scheduled in the order of their arrival, for example, they are executed sequentially as R1R2R3R4. In particular, commands are scheduled as follows: pre-charge read for R1 (Pr1), activate read for R1 (Ar1), CAS read for R1 (Rr1), CAS read for R2 (Rr2), CAS read for R3 (Rr3) and CAS read for R4 (Rr4).

For "out of order" scheduling 204, read commands are scheduled out of order. For example, commands R3 and R4 (accessing different banks) are shown scheduled "out of order" with respect to R1 and R2. In particular, as shown in FIG. 2, R3 is scheduled out of order such that it is scheduled between pre-charge read for R1 (Pr1) and activate read for R1 (Ar1), and R4 is scheduled out of order such that it is scheduled between activate read for R1 (Ar1) and CAS read for R1 (Rr1). Referring to FIG. 2, between pre-charge read for R1 (Pr1) and activate read for R1 (Ar1), a read from another bank, for example R3, can be scheduled. Read R2, to the same bank as R1, cannot be scheduled until R1 is completed.

Out of order read scheduling provides better DRAM command and data bus utilization and performance since the scheduling period is shortened. A similar technique can be used for scheduling write transactions as well. When necessary, proposed out of order scheduling may delay issuing successive DRAM commands such that the interval between those two commands may exceed minimum core timing specification in order to get the best command utilization. For example, in a memory system with 3/3/3 core timings and a 2n command timing a precharge and activate may be separated by more than 3 clocks when another command is scheduled out of order with respect to the page miss.

Figure 3:
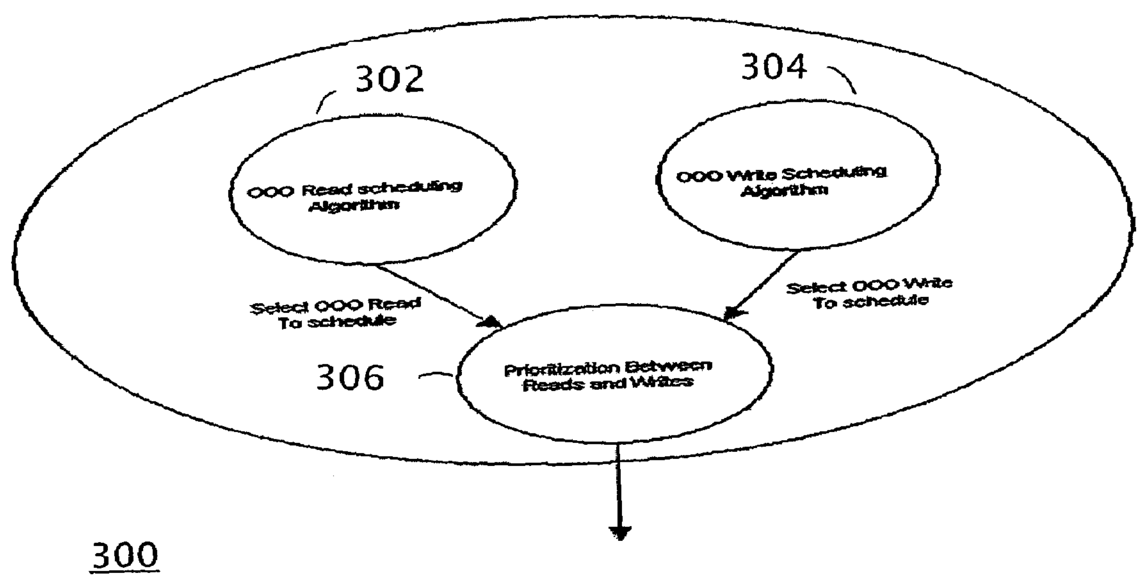
FIG. 3 illustrates a diagram of one embodiment of components of out of order scheduling.

FIG. 3 illustrates a diagram of one embodiment 300 of components of out of order scheduling. The out of order scheduling algorithm contains a read out of order scheduling algorithm 302, a write out of order scheduling algorithm 304, and an algorithm to prioritize between reads and writes 306. The memory controller (not shown) may be configured to include logic to make the determination of when to prioritize between read and write commands. In particular, using more flexible write scheduling, a scheduled write may be preempted by a read to optimize read latency.

Figure 4:
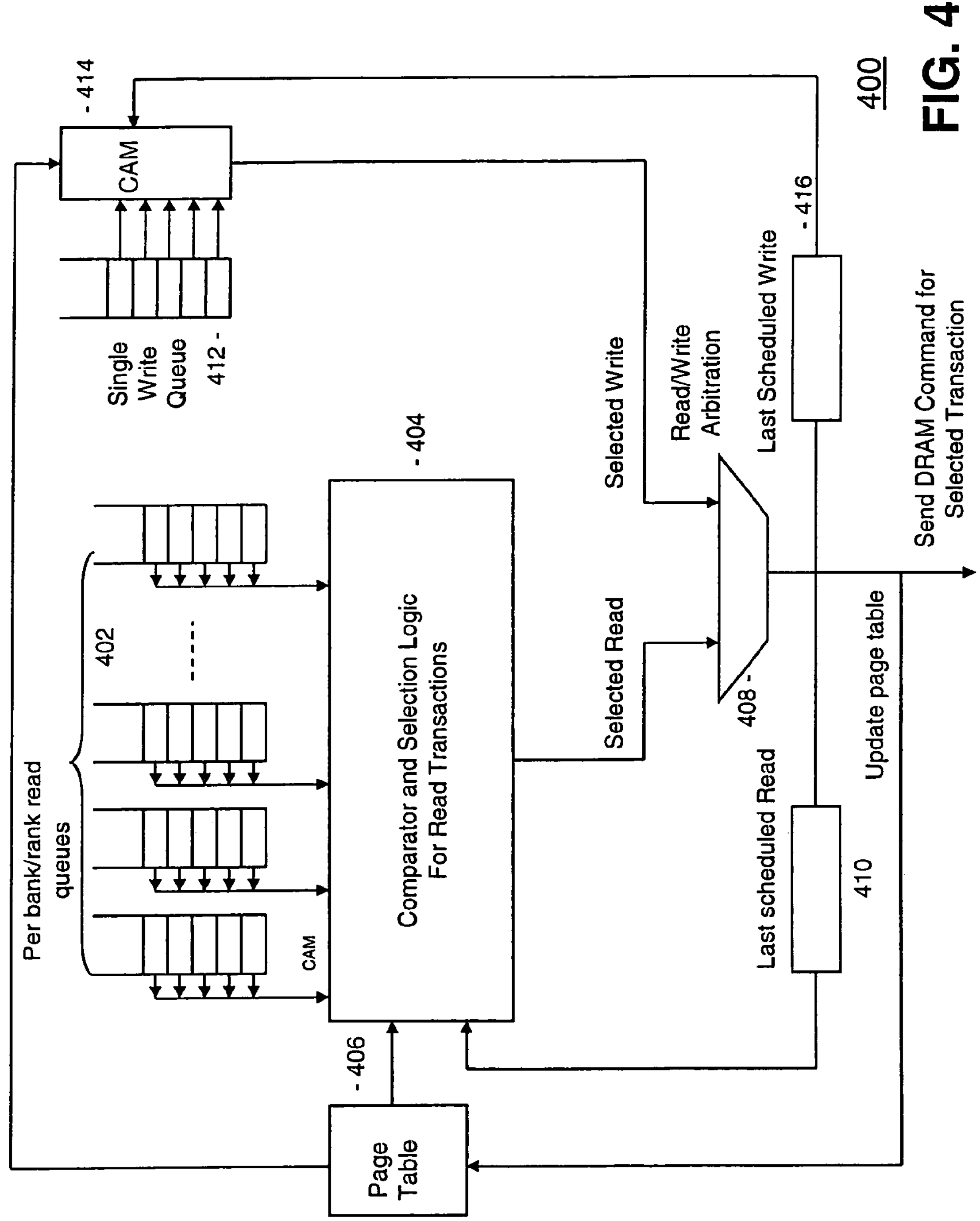
FIG. 4 illustrates a diagram of an embodiment of an out of order scheduling system.

FIG. 4 illustrates a diagram of an embodiment 400 of an out of order scheduling system. Read and write transactions are entered into separate queues and scheduled from there based on the state of the system. FIG. 4 shows an embodiment where reads and writes are scheduled using different algorithms and illustrates one possible combination of read write scheduling algorithms described later. Specifically, it shows a multi-queue read scheduling algorithm combined with a single queue on-page write scheduling algorithm. The figure is for illustrative purposes only and may be changed for other algorithms.

Embodiment 400 includes a read queue per DRAM bank (for every DRAM rank) 402, and a single write queue 412. Rank may correspond to a chip select address for a multiple chip select configuration. In another embodiment, an algorithm that relaxes the multiple queue requirement and provides comparable performance is discussed in detail later.

A transaction in a queue may be blocked or unblocked and the state is indicated by a blocked bit. A read or write transaction is blocked from scheduling if a DRAM command cannot be sent for that transaction as dictated by DRAM specification constraints. One example of a DRAM constraint that may block a transaction from being scheduled is the DRAM core timing, e.g. 4/4/4; when a pre-charge is scheduled for R1 (FIG. 2), no command can be scheduled for the next 3 cycles to that DRAM bank. Referring to FIG. 4, unblocked reads from each queue are sent to the comparator and selection logic block 404. The comparator may select either an oldest unblocked read or an unblocked page hit from the queue as described in the algorithm later. Comparator and selection logic gets page table information 406 that is used to determine if an unblocked read is a page hit, empty, or a page miss. Similarly, the comparator and selection block gets last scheduled read 410 to check if it was a page miss, empty, or a hit to make a read scheduling selection.

Transactions in write queue may be similarly blocked after they are scheduled. An associative memory, such as a content associative memory (CAM) 414, uses logic to compare the last scheduled write 416 with unblocked writes in the write queue 412 to determine the ones that are to the same page and those that are non-conflicting with the last scheduled write. Page table information 406 may also be sent to the write queue CAM logic 414 to determine if writes are page hits or misses when required by the algorithm. An algorithm that finds a write to the same page or a non conflicting write with last write may not need page table information and could do that determination from address map information. Embodiments of algorithms that use this information are described in detail later. In order scheduling may generate write bursts such that:

1. back to back write page misses in a write burst are to the same bank; and
2. accesses to the same page in a bank may be interrupted by accesses to other pages in the bank resulting in page misses that can be avoided Embodiments of the out of order write scheduling algorithm avoid instances noted in point 1 above by scheduling other write transactions between the back to back page misses when possible. Embodiments of the out of order scheduling algorithm avoids instances of point 2 noted above by clustering accesses to the same page together. This improves command scheduling to the DRAM. In a typical embodiment, there is coherency between reads and writes (not shown in FIG. 4) is checked such that any reads that are to same addresses as writes in the write queue are forwarded data from the write queue and do not get stale data from memory.

Read/write arbitration 408 prioritizes between reads and writes. The proposed out of order scheduling algorithm gets better performance by preempting a previously scheduled write transaction with a read transaction that may arrive later. The performance improvement results from optimizing read latency.

Read Scheduling

Figure 5:
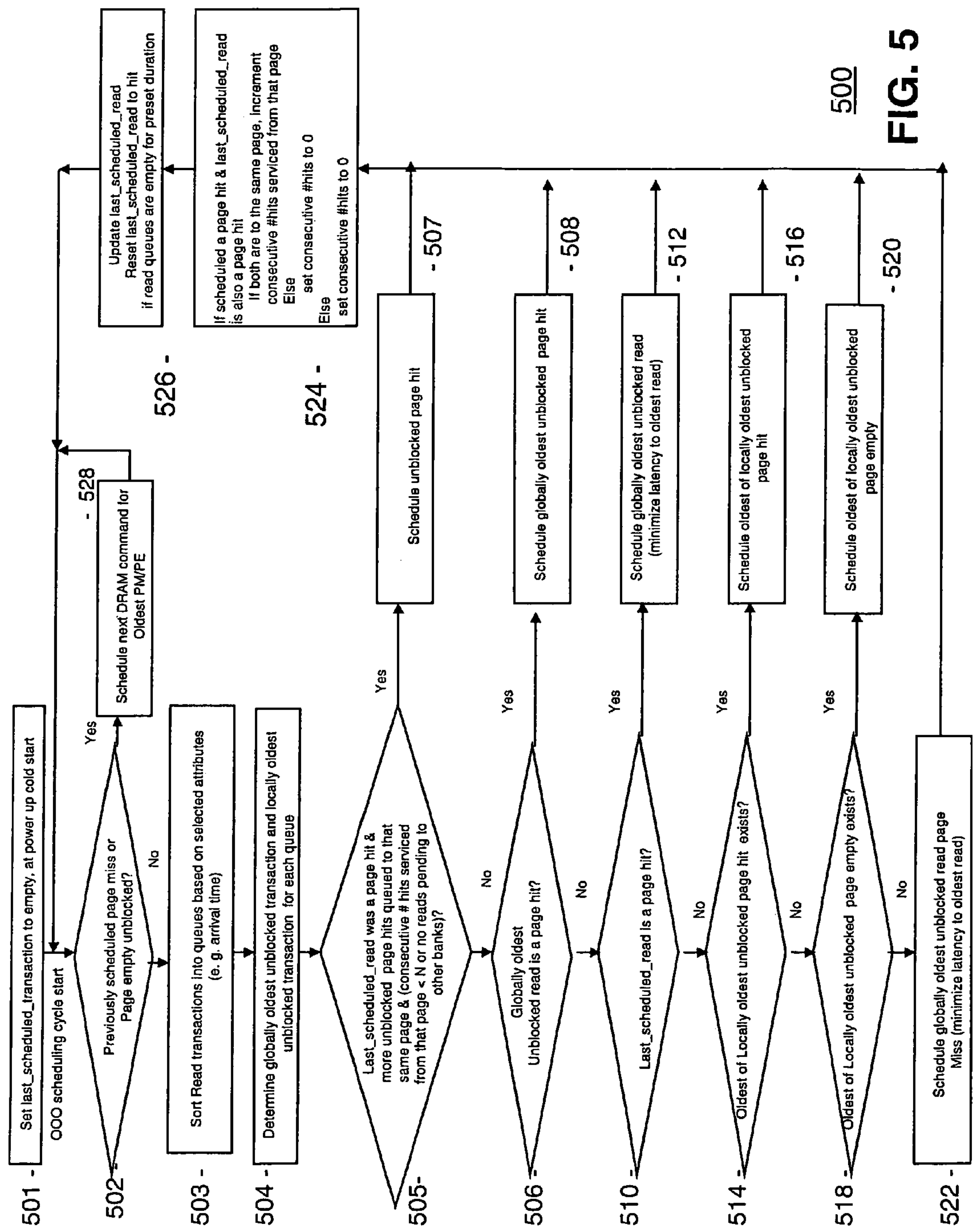
FIG. 5 illustrates a detailed flow diagram of an embodiment of an algorithm for out of order read scheduling for a plurality of queues.

FIG. 5 illustrates a detailed flow diagram of an embodiment 500 of an algorithm for out of order read scheduling using multiple read queues. The algorithm can be adapted for write scheduling as well. If this algorithm were adapted for write scheduling, FIG. 4. would have similar hardware blocks for write scheduling as shown for read scheduling. Referring to FIG. 4, there is a queue for each bank and rank combination. For example, in a configuration where there are 4 independent banks and 2 ranks, there are 8 different combinations.

Embodiments of the invention assume that the DRAM page table entries are in a page empty state at power up cold start. In step 501, the read scheduled in a previous arbitration cycle (also referred to as "the last scheduled read") is set to a to page empty state.

In step 503, read transactions are sorted into queues based upon selected attributes. For example, read transactions are sorted into queues based upon the read address and address mapping used by memory. Read transactions in each queue are sorted by their arrival time. Other attributes including, but not limited to, CPU priority and demand versus prefetch transaction type may be used in sorting the transactions as well. Reads in separate queues will not have page conflicts with each other. A locally oldest transaction in each queue and a globally oldest transaction among queues may be identified.

Transaction scheduling and DRAM command scheduling are differentiated. A read or write transaction is considered scheduled when the first DRAM command for that transaction is issued. However, more DRAM commands may need to be scheduled to complete the transaction. For example, a page miss transaction is considered scheduled when its precharge DRAM command is issued whereas a page hit transaction is considered scheduled when its CAS DRAM command is issued. In case of page miss, more DRAM commands need to be scheduled later to complete the transaction. If there are more DRAM commands to be scheduled for a transaction that has been scheduled, these are scheduled after the transaction becomes unblocked after scheduling of previous DRAM command. Scheduling of remaining DRAM commands of a scheduled transaction after the transaction is unblocked are prioritized over scheduling new transactions. However, until a previously scheduled transaction is unblocked, a new transaction may be scheduled. Depending on the time at which a previously scheduled transaction gets unblocked and when a new transaction was scheduled before it, DRAM constraints may push out the scheduling of the remaining DRAM commands of a previously scheduled transaction when it gets unblocked to exceed minimum core timings. Step 502 checks if a previously scheduled page miss or page empty is unblocked for which we have to schedule more DRAM commands. Step 528 schedules such DRAM commands with a high priority over scheduling new transactions. If a DRAM command of a later transaction is scheduled before the last DRAM command of an earlier transaction, the later transaction is described as being scheduled out of order (includes overlapped scheduling).

In step 504, the locally oldest unblocked transaction in each read queue is determined. This transaction can be a read hit, empty or miss. Also, the globally oldest unblocked transaction among the read queues is determined. This transaction may be a read hit, empty or miss.

In step 505, whether there are page hits deeper in read queues is determined. If the last scheduled read is a page hit and if there are more unblocked read page hits in the queue and if either less than a preset number of consecutive page hits from the queue were selected or if this is the only queue with reads in it, then an unblocked read page hit from the queue is selected in 507 and the number of consecutive page hits selected from that page is incremented in 524. If no consecutive page hits were selected, the count is reset in step 524.

In step 506, if the globally oldest unblocked transaction is a page hit, that page hit is scheduled first (step 508). This minimizes latency to the oldest page hit.

In step 510, if the last scheduled read was a page miss or page empty and locally oldest unblocked "page hits" exist in other queues (step 514), the oldest of those page hits is scheduled (step 516). This scheduled page hit is out of order with the previous read transaction if the last DRAM command of the last scheduled read has not yet been scheduled.

For example, referring to FIG. 2, if the last scheduled read was a page miss such as R1, a page hit such as R3 from another queue is scheduled out of order with the previous page miss. In particular, R3 is scheduled out of order such that it is scheduled after the pre-charge read command (Pr1) and before an activate read command R1 (Ar1) for previous page miss R1.

In another example, if the last scheduled read was a page empty, a page hit from another queue is scheduled out of order with the previous page empty. In particular, the page hit is scheduled out of order such that it is scheduled after an activate command of the previous page empty.

If the last scheduled read was a page miss or page empty (step 510) and an oldest unblocked "page empty" exists from a different queue (step 518), that page empty is scheduled (step 520).

If the last scheduled read was a page miss or page empty (step 510) and no locally oldest unblocked page hit (step 514) or unblocked page empty (step 518) exists from another queue, the globally oldest page miss read transaction is scheduled out of order (overlapped) with the previous read transaction (step 522). Referring back to FIG. 2, the page miss is scheduled after the pre-charge read command and before an activate read command R1 for the previous page miss.

In step 510, if the last scheduled read is a page hit (rather than a page miss or page empty), the globally oldest unblocked read transaction is scheduled after the last page hit transaction (step 512). This minimizes latency to oldest read transaction.

In step 526, the state of last scheduled read is updated. If all queues are empty for a preset duration, last scheduled read is set to a page hit state so that when read transactions start arriving, the algorithm selects the oldest transaction to minimize latency to oldest read.

Although the algorithm in FIG. 5 has been described with queues per bank and rank combination, the algorithm may be extended to the case where there is only per rank or per bank queues. For example, if only one queue per bank of the memory system is present, then the accesses to different ranks will be aliased to the same queue and embodiments of the present invention select from these accesses using the algorithm described, the entries from separate queue are non-conflicting.

Embodiments of the invention are not limited to the configuration shown in FIG. 5 or described above. For example, in one embodiment, a hardware-optimized algorithm reduces the number of read queues for out of order scheduling and also simplifies the read selection algorithm shown in FIG. 6. In this simplified algorithm, transaction scheduling is simplified compared to FIG. 5 by selecting transactions that are non-conflicting with last scheduled read instead of explicitly attempting to select page hits and page empties under last scheduled read as in FIG. 5. Non-conflicting transaction selection is algorithmically simpler and yields only slightly lower performance than algorithm in FIG. 5 that does more specific selection. Another embodiment is a page-hit-first algorithm that prioritizes reads in page hit, page empty, and page miss order. The hardware-optimized algorithm embodiment is described first.

Figure 6:
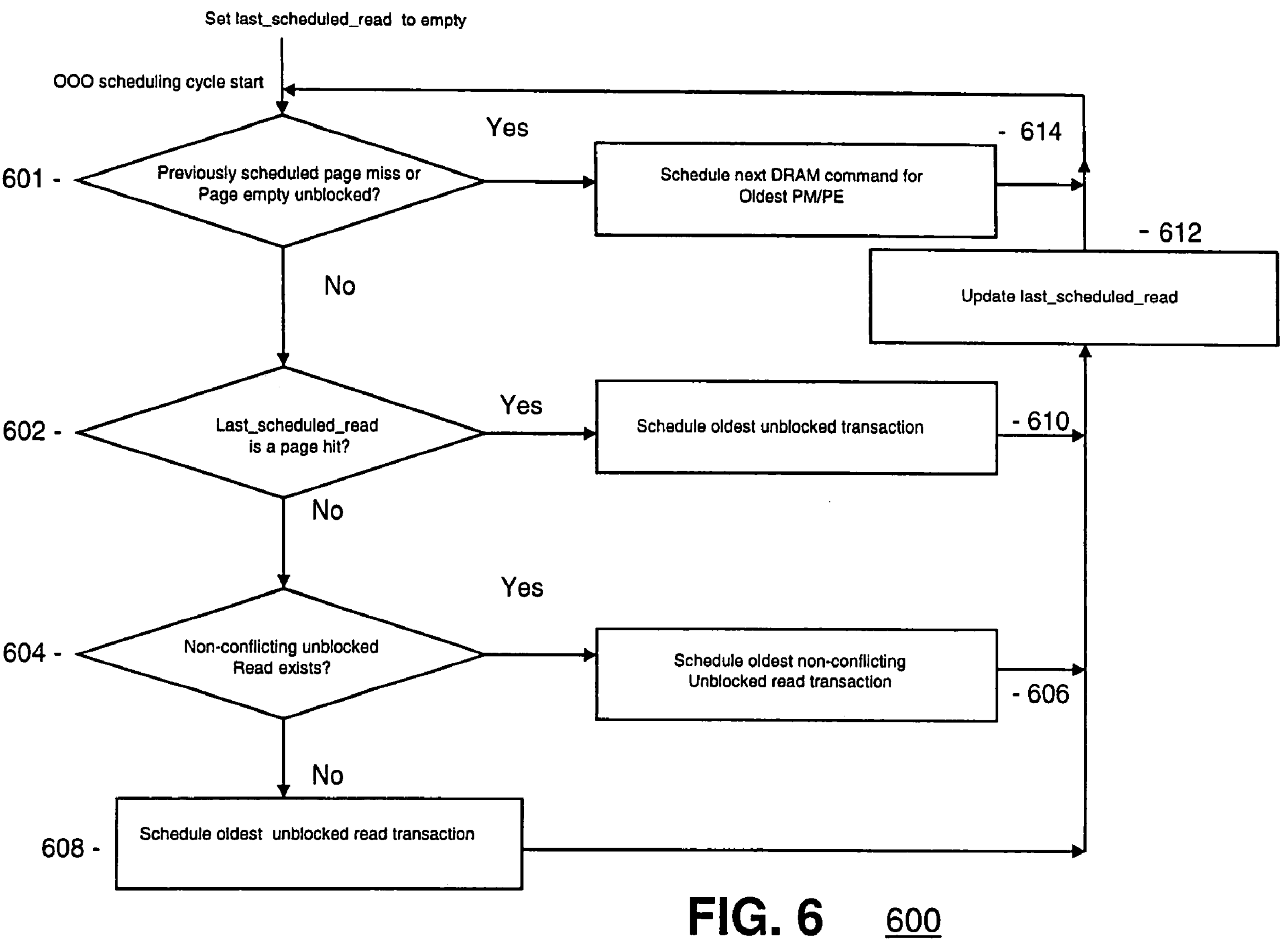
FIG. 6 illustrates a detailed flow diagram of an embodiment of an algorithm for hardware optimized out of order read scheduling.

FIG. 6 illustrates a detailed flow diagram of an embodiment 600 of an algorithm for hardware optimized out of order scheduling. All read transactions are entered in a single queue. Only the unblocked read transactions are considered for selection.

Step 601 checks if a previously scheduled page miss or page empty is unblocked for which we have to schedule more DRAM commands. Step 614 schedules such DRAM commands with a high priority over scheduling new transactions.

A non-conflicting read is a read that has either rank or bank number different from the last scheduled read transaction. In step 602, if the last scheduled read transaction is a page miss or page empty and a non-conflicting unblocked read exists (step 604), the oldest non-conflicting unblocked read is scheduled (step 606).

For example, if the last scheduled read was a page miss, and a non-conflicting read is a page hit, the page hit is scheduled out of order with the previous page miss. The non-conflicting page hit may be scheduled after the pre-charge read command and before the activate read command for the previous page miss.

In step 608, if no non-conflicting read with the last scheduled page miss or page empty exists, the oldest unblocked read transaction is scheduled. This oldest read transaction can be a read hit, empty or miss.

In step 610, if the last scheduled read is a page hit, the oldest unblocked read transaction is scheduled after the last scheduled page hit. This oldest read transaction can be a read hit, empty or miss. The state of last scheduled read is updated in 612 based on the last read that was scheduled.

Figure 7:
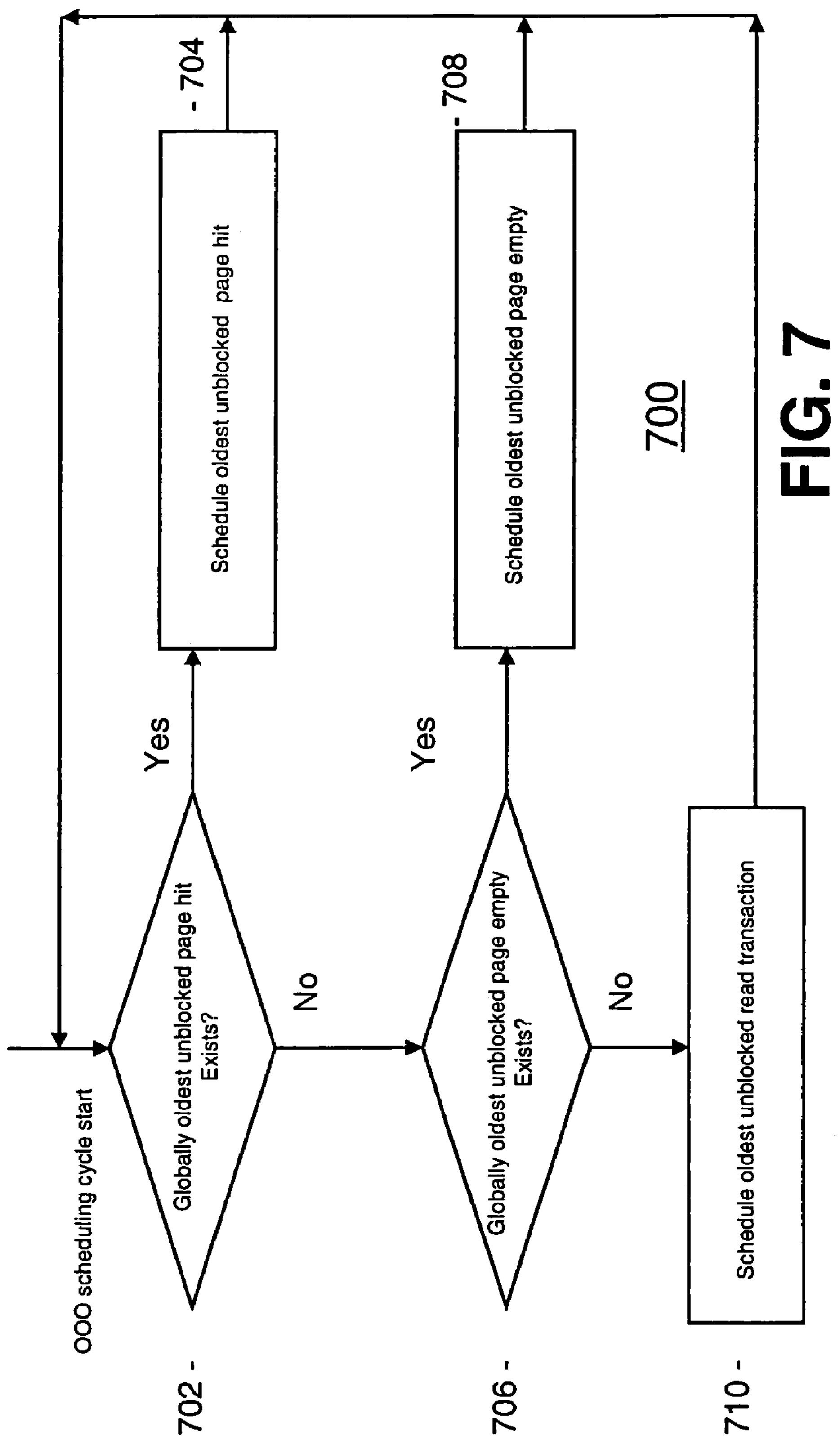
FIG. 7 illustrates a detailed flow diagram of another embodiment of an algorithm for page-hit-first scheduling.

A detailed flow diagram of an embodiment 700 of page-hit-first algorithm for out of order read scheduling is illustrated in FIG. 7. This algorithm has a single queue for reads. In this algorithm, a selected read transaction will be scheduled in order with the previously scheduled read if the previously scheduled read is a page hit else it may be scheduled out of order. This algorithm does not consider last scheduled read in making an out of order selection.

In step 702, an oldest unblocked transaction that is a page hit is scheduled first (step 704). This minimizes latency to oldest page hit.

In step 706, if there is an oldest unblocked "page empty," that oldest page empty is scheduled (step 708).

In step 710, if no unblocked page hit or empty exists, the globally oldest unblocked read transaction is scheduled. In such case, an oldest page miss will be scheduled.

The hardware optimized algorithm with a single queue can be extended to having more than one queue from which non-conflicting transactions may be selected.

One skilled in the art will recognize that the read out of order scheduling algorithms may be adapted for writes as well. Additionally, any of the read scheduling algorithms may be combined with the write scheduling algorithms to get a total out of order scheduling solution as described in FIG. 3.

Write Scheduling

Figure 8:
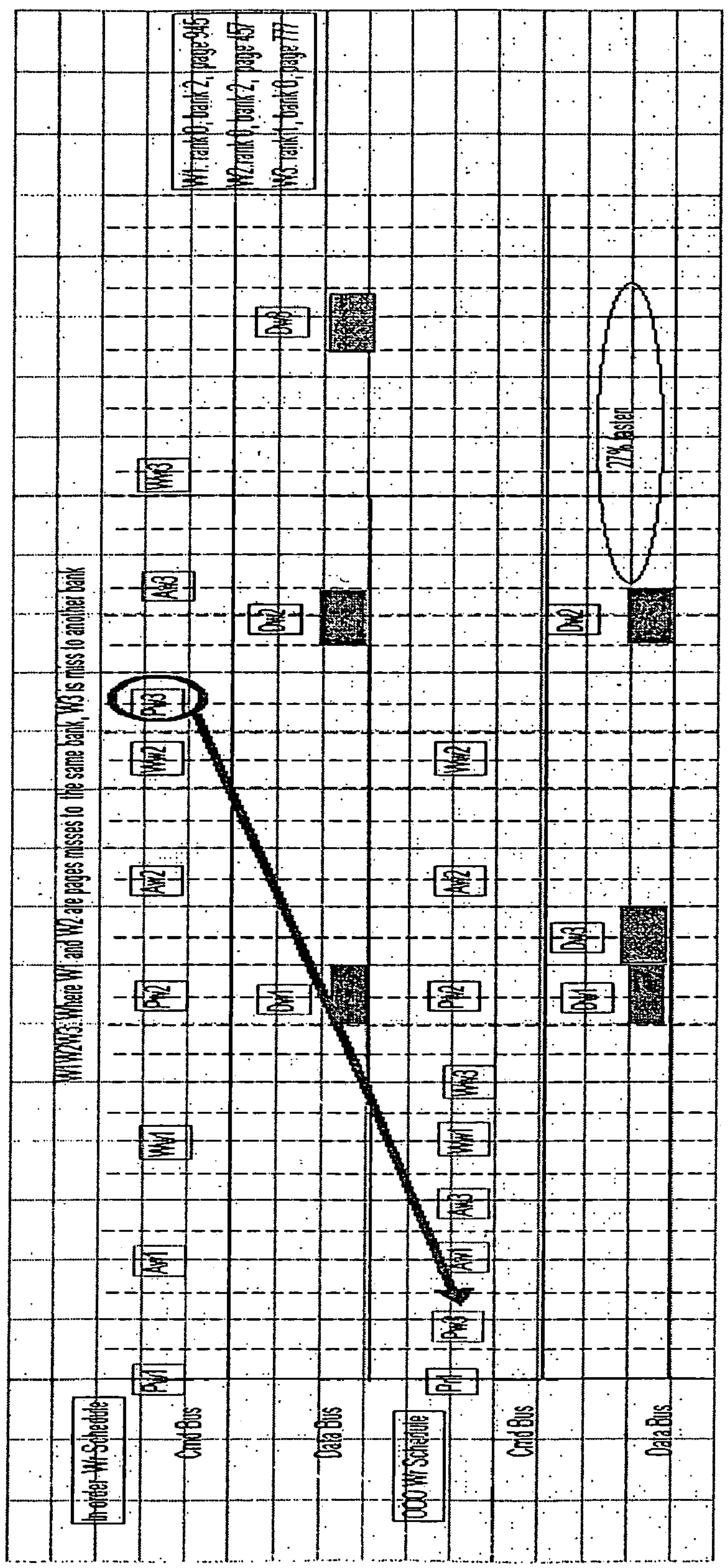
FIG. 8 illustrates a timing diagram of an embodiment of a command bus issuing write commands using "in order" and "out of order" scheduling.

FIG. 8 illustrates a timing diagram of an embodiment 800 of a command bus (CmdBus) issuing write commands using "in order" 802 and "out of order" 804 scheduling. The data bus line (DataBus) illustrates when the write data is written to the memory device. The example shown is for a write burst from a SPECfp application and DDR memory system with 4/4/4 core timing (tCL/tRCD/tRP), 2n command timing, burst length 4 and tRAS 13 is utilized. One skilled in the art will recognize the example shown is for illustrative purposes. Embodiments of the present invention can be applied to various implementations. W1 and W2 represent page misses to the same bank. W3 represents a miss to another bank.

In order write scheduling may generate back to back write page misses in a write burst to the same bank and the commands for these page misses go in order. Performance is improved by scheduling other write transactions out of order with back to back write page misses to the same bank. This improves command scheduling to the DRAM as shown in 804. In order scheduling may also generate write pattern in a burst such that accesses to the same page in a bank are interrupted by accesses to other pages in the bank. Out of order scheduling clusters accesses to the same page together so that page misses can be avoided.

Figure 9:
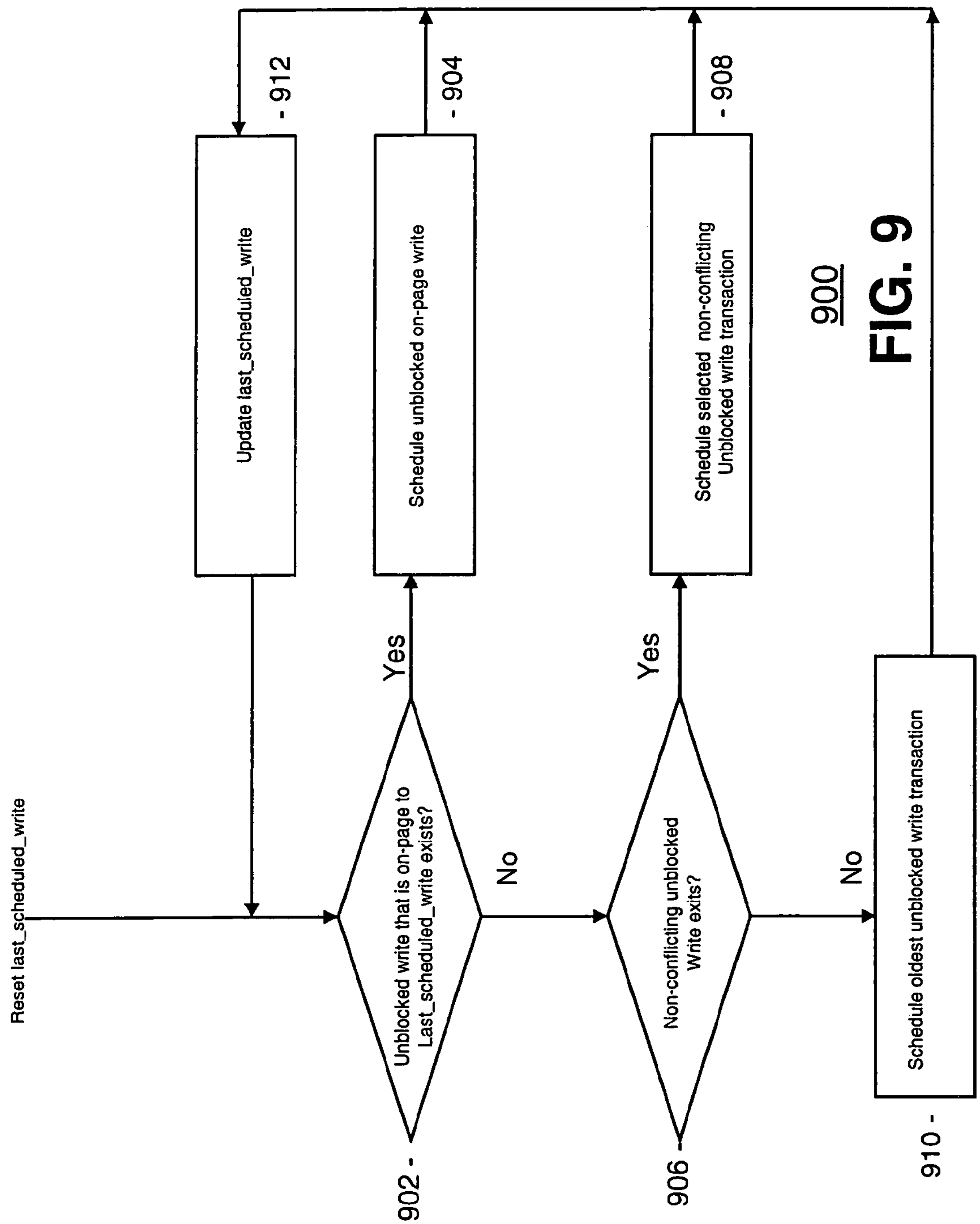
FIG. 9 illustrates a detailed flow diagram of an embodiment of an algorithm for out of order write scheduling.
Figure 10:
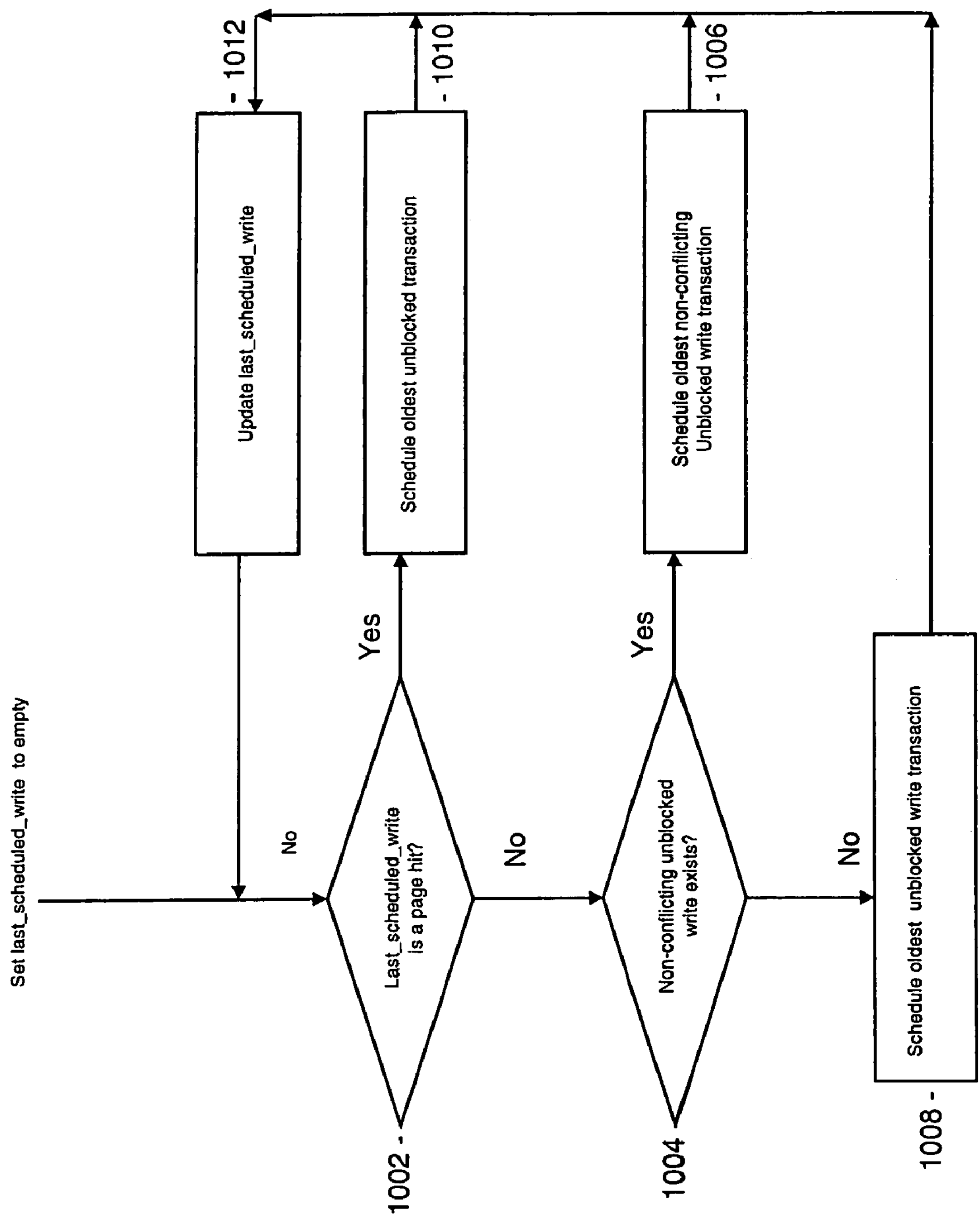
FIG. 10 illustrates a detailed flow diagram of an embodiment of an algorithm for out of order write scheduling.

Embodiments of the invention are not limited to what is shown or discussed with respect to FIG. 8. For example, embodiments of two write scheduling algorithms are shown in FIG. 9 and FIG. 10. The first algorithm in FIG. 9 selects write page hits to the same page as last scheduled write first and then selects non-conflicting writes with the last scheduled write. This algorithm needs only address mapping information and not page table state to make the selection. The second algorithm in FIG. 10 selects any write page hit first and selects a non-conflicting write transaction with last scheduled write if no write page hit exists. This algorithm needs page table state information to select a write page hit.

FIG. 9 illustrates a detailed flow diagram of an embodiment 900 of an algorithm for out of order write scheduling that selects on-page writes first. A non-conflicting write is a write that has either rank or bank number different from the last scheduled write.

In step 902, if the write queue has an unblocked write transaction to the same page as the write dispatched in the last arbitration cycle, that write is scheduled (step 904). Any on-page writes in the queue are thus scheduled first.

In step 906, if the write queue does not have any write transaction to the same page as that of the last write dispatched and there is an unblocked write in the queue that is non-conflicting with the last write dispatched, that write is scheduled (step 908). One skilled in the discipline will realize that the age of the write is not critical to performance, that is, writes are usually posted, so their performance is not sensitive to latency of the write path. The write algorithm selects oldest unblocked write not for latency reason but because it helps in controlling the degree of out of orderness between write commands. For example, if precharge of a write page miss W1 is scheduled, this write is blocked for tRP. After W1 is unblocked, its activate command is scheduled before too many other writes are scheduled. Forcing an unblocked oldest selection discipline helps select W1 again so that its other DRAM commands may be scheduled before too many other writes get scheduled. In step 910, if there is no non-conflicting write with the last write dispatched, the oldest unblocked write transaction is scheduled in order. In step 912 the last scheduled write is updated.

FIG. 10 shows a detailed flow diagram of an embodiment 1000 of an algorithm for out of order write scheduling that is similar to hardware optimized read scheduling.

In step 1002, if the last scheduled write transaction is a page miss or page empty and a non-conflicting write exists (step 1004), oldest unblocked non-conflicting write is scheduled (step 1006). For example, if the last scheduled write was a page miss, and a non-conflicting write is a page hit, the page hit may be scheduled out of order with the previous page miss.

If no non-conflicting write with the last scheduled page miss or empty exists, the oldest write transaction is scheduled in order in 1008. This oldest write transaction can be a read hit, empty or miss. If the last scheduled write is a page hit (step 1002), then the oldest unblocked write is selected in 1010. The state of last scheduled write is updated in 1012.

Read/Write Prioritization

Reads are prioritized over writes to minimize latency to read data. If read transactions are present in a read queue, they are scheduled first. If the write queue fills up we may either block further transactions from entering out of order queues until the write queue has space for more transactions or choose to drain a preset number of writes before scheduling more reads. A previously scheduled write page miss or page empty may be preempted by a read that arrives before the last DRAM command for the write is scheduled. This minimizes latency to reads and also provides some performance gain. However, the prioritization algorithm works well even without such preemption.

In one embodiment, the read transactions are scheduled in accordance with one or more of the scheduling algorithms described herein. One skilled in the art will recognize that other algorithms can be used as well. The latency to reads is thus minimized. Write transactions are scheduled in accordance with one or more of the scheduling algorithms described herein. One skilled in the art will recognize that other algorithms can be used as well.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for out of order read or write scheduling using at least one queue, comprising:

sorting memory transactions into at least one queue;

within at least one queue, sorting memory transactions by attributes including address and address mapping used by memory, processor priority and demand versus prefetch transaction type;

scheduling memory transactions out of order in accordance with scheduling algorithms, wherein if a DRAM command of a later memory transaction is scheduled before the last DRAM command of an earlier memory transaction, the later memory transaction is considered scheduled out of order and wherein the entire at least one queue is considered while making scheduling decisions;

accommodating page closing policy with no prior assumption being made about pages being in a particular page miss or page empty or page hit state; and making out of order selection at the time of DRAM command launch.

2. The method claimed in claim 1, wherein making out of order selection at the time of DRAM command launch further comprises:

in response to making an out of order selection at the time of DRAM command launch and not earlier, allowing at least one queue to fill up without delaying the DRAM command.

3. The method claimed in claim 1, wherein a selected write may be preempted by a read to optimize latency.

4. The method claimed in claim 1, further comprising:

selectively scheduling DRAM commands at intervals longer than minimum DRAM timings core timings to accommodate higher density of command scheduling achieved from out of order scheduling.

5. The method claimed in claim 1, wherein there is a queue for each bank and rank combination.

6. The method claimed in claim 1, further comprising:

determining globally oldest unblocked memory transaction and locally oldest unblocked memory transaction for each queue;

determining whether last scheduled read was a page hit and more unblocked read page hits are queued to that same page, and either consecutive number of page hits serviced from that page is less than a predefined number or no reads pending to other banks.

7. The method claimed in claim 6, further comprising:

in response to absence of a globally oldest unblocked read that is a page hit, last scheduled read that is a page hit, oldest of the locally oldest unblocked page hit and oldest of the locally oldest page empty existing, scheduling a globally oldest unblocked read page miss.

8. The method claimed in claim 6, further comprising in response to a scheduled page hit and a last scheduled read that is also a page hit and both are to the same page, incrementing a count, else setting the number of consecutive hits to zero;

in response to no consecutive page hits selected, resetting count to zero;

resetting the last scheduled read to hit in response to read queues being empty for preset duration; and returning to start of the scheduling cycle.

9. The method claimed in claim 6, wherein the globally oldest unblocked memory transaction and locally oldest unblocked memory transaction for each queue may be a read hit, empty or miss.

10. The method claimed in claim 6, wherein determining whether last scheduled read was a page hit and more unblocked read page hits are queued to that same page, and either consecutive number of page hits serviced from that page is less than a predefined number or no reads pending to other banks further comprises:

scheduling an unblocked page hit;

in response to a scheduled page hit and a last scheduled read that is also a page hit and both are to the same page, incrementing the count else setting the number of consecutive hits to zero;

in response to no consecutive page hits selected, resetting the count to zero;

resetting the last scheduled read to hit in response to read queues being empty for preset duration; and returning to start of the scheduling cycle.

11. The method claimed in claim 6, wherein in response to a globally oldest unblocked read being a page hit, scheduling a globally oldest unblocked page hit;

in response to a scheduled page hit and a last scheduled read that is also a page hit and both are to the same page, incrementing the count else setting the number of consecutive hits to zero;

in response to no consecutive page hits selected, resetting the count to zero;

resetting the last scheduled read to hit in response to read queues being empty for preset duration; and returning to start of the scheduling cycle.

12. The method claimed in claim 6, wherein determining whether the last scheduled read is a page hit further comprises:

scheduling the globally oldest unblocked read;

in response to a scheduled page hit and a last scheduled read that is also a page hit and both are to the same page, incrementing the count else set the number of consecutive hits to zero;

in response to no consecutive page hits selected, resetting the count to zero;

resetting the last scheduled read to hit in response to read queues being empty for preset duration; and returning to start of the scheduling cycle.

13. The method claimed in claim 6, wherein determining whether the oldest of the locally oldest unblocked page hit exists further comprises:

scheduling the oldest of the locally oldest unblocked page hit;

in response to a scheduled page hit and a last scheduled read that is also a page hit and both are to the same page, incrementing the count else set the number of consecutive hits to zero;

in response to no consecutive page hits selected, resetting count to zero;

resetting the last scheduled read to hit in response to read queues being empty for preset duration; and returning to start of the scheduling cycle.

14. The method claimed in claim 6, wherein determining whether the oldest of the locally oldest page empty exists further comprises:

scheduling the oldest of the locally oldest unblocked page empty;

in response to a scheduled page hit and a last scheduled read that is also a page hit and both are to the same page, incrementing the count else set the number of consecutive hits to zero;

in response to no consecutive page hits selected, resetting count to zero;

resetting the last scheduled read to hit in response to read queues being empty for preset duration; and returning to start of the scheduling cycle.

15. The method claimed in claim 1, wherein scheduling memory transactions out of order in accordance with scheduling algorithms, further comprises:

in response to absence of an unblocked previously scheduled page miss or page empty, last scheduled read that is a page hit and non-conflicting unblocked read, scheduling an oldest unblocked read transaction.

16. The method claimed in claim 15, further comprising:

in response to an unblocked previously scheduled page miss or page empty, scheduling a next DRAM command for the oldest page miss or page empty.

17. The method claimed in claim 15, further comprising:

in response to a last scheduled read being a page hit, scheduling an oldest unblocked transaction and updating a last scheduled read.

18. The method claimed in claim 15, further comprising:

in response to the last scheduled read being a page hit, scheduling an oldest non-conflicting unblocked read transaction and updating a last scheduled read.

19. The method claimed in claim 1, wherein scheduling memory transactions out of order in accordance with scheduling algorithms, further comprises:

in response to absence of a globally oldest unblocked page hit and globally oldest unblocked page empty, scheduling an oldest unblocked read transaction.

20. The method claimed in claim 19, further comprising:

in response to a globally oldest unblocked page hit, scheduling the oldest unblocked page hit.

21. The method claimed in claim 19 further comprising:

in response to globally oldest unblocked page empty, scheduling the oldest unblocked page empty.

22. The method claimed in claim 1, wherein scheduling memory transactions out of order in accordance with scheduling algorithms, further comprises:

in response to absence of an unblocked write that is on-page to last scheduled write and non-conflicting unblocked write, scheduling the oldest unblocked write transaction and updating the last scheduled write.

23. The method claimed in claim 22, further comprising:

in response to an unblocked write that is on-page to a last scheduled write, scheduling an unblocked on-page write and updating the last scheduled write.

24. The method claimed in claim 22, further comprising:

in response to non-conflicting unblocked write, scheduling selected non-conflicting unblocked write transaction and updating the last scheduled write.

25. The method claimed in claim 1, wherein scheduling memory transactions out of order in accordance with scheduling algorithms, further comprises:

in response to absence of a last scheduled write that is a page hit and a non-conflicting unblocked write, scheduling the oldest unblocked write transaction and updating the last scheduled write.

26. The method claimed in claim 25, further comprising:

in response to a last scheduled write is a page hit, scheduling the oldest unblocked transaction and updating the last scheduled write.

27. The method claimed in claim 25, further comprising:

in response to a non-conflicting unblocked write, scheduling the oldest non-conflicting unblocked write transaction and updating the last scheduled write.

28. A machine readable medium having stored therein a plurality of machine readable instructions executable by a processor for out of order memory scheduling using at least one queue, comprising:

instructions to sort memory transactions into at least one queue including address and address mapping used by memory, processor priority and demand versus prefetch transaction type;

instructions to, within at least one queue, sorting memory transactions by attributes;

instructions to schedule memory transactions out of order in accordance with scheduling algorithms, wherein if a DRAM command of a later transaction is scheduled before the last DRAM command of an earlier transaction, the later transaction is considered scheduled out of order and wherein the entire at least one queue is considered while making scheduling decisions;

instructions to accommodate page closing policy with no prior assumption being made about pages being in a particular page miss or page empty or page hit state; and instructions to make out of order selection at the time of DRAM command launch.

29. The machine readable medium claimed in claim 28, wherein making out of order selection at the time of DRAM command launch further comprises:

instructions to, in response to making an out of order selection at the time of DRAM command launch and not earlier, allow at least one queue to fill up without delaying the DRAM command.

30. The machine readable medium claimed in claim 28, further comprising:

instructions to preempt a selected write transaction by a read transaction to optimize latency.

31. The machine readable medium claimed in claim 28, further comprising:

instructions to selectively schedule DRAM commands at intervals longer than minimum DRAM timings core timings to accommodate higher density of command scheduling achieved from out of order scheduling.

32. The machine readable medium claimed in claim 28, wherein there is a queue for each bank and rank combination.

33. An apparatus comprising:

at least one queue associated with a memory bank for receiving memory transactions sorted by attributes including address and address mapping used by memory, processor priority and demand versus prefetch transaction type;

a page table to store information related to memory transactions; and a comparator and selector for receiving unblocked memory transactions from at least one queue and receiving page table information to determined if the unblocked transaction is a page hit, page miss or page empty, wherein memory transactions are scheduled out of order in accordance with scheduling algorithms, the entire at least one queue is considered while making scheduling decisions, page closing policy accommodations are made with no prior assumption about pages being in a particular page miss or page empty or page hit state and out of order selections are made at the time of DRAM command launch.

34. The apparatus claimed in claim 33, wherein if a DRAM command of a later memory transaction is scheduled before the last DRAM command of an earlier memory transaction, the later memory transaction is considered scheduled out of order.

35. The apparatus claimed in claim 33, further comprising:

an arbitrator for prioritizing between read and write memory transactions.

36. The apparatus claimed in claim 33, further comprising:

a content associative memory (CAM) to determine if memory transactions are page hits or misses.

37. The apparatus claimed in claim 36, wherein the memory transactions comprise write transactions.

38. The apparatus claimed in claim 33, wherein in response to making an out of order selection at the time of DRAM command launch, at least one queue fills up without delaying the DRAM command.

39. The apparatus claimed in claim 33, DRAM commands are selectively scheduled at intervals longer than minimum DRAM timings core timings to accommodate higher density of command scheduling achieved from out of order scheduling.

40. The apparatus claimed in claim 33, wherein there is a queue for each bank and rank combination.

41. A system comprising:

a memory including a plurality of banks; and a memory controller operatively in communication with the memory; at least one queue associated with a memory bank for receiving memory transactions sorted by attributes including address and address mapping used by memory, processor priority and demand versus prefetch transaction type;

a page table to store information related to memory transactions; and a comparator and selector for receiving unblocked memory transactions from at least one queue and receiving page table information to determined if the unblocked transaction is a page hit, page miss or page empty, wherein memory transactions are scheduled out of order in accordance with scheduling algorithms, the entire at least one queue is considered while making scheduling decisions, page closing policy accommodations are made with no prior assumption about pages being in a particular page miss or page empty or page hit state and out of order selections are made at the time of DRAM command launch.

42. The system claimed in claim 41, wherein if a DRAM command of a later memory transaction is scheduled before the last DRAM command of an earlier memory transaction, the later memory transaction is considered scheduled out of order.

* * * * *